(12) United States Patent
Dennis

(10) Patent No.: US 6,200,507 B1
(45) Date of Patent: Mar. 13, 2001

(54) METHOD OF MAKING A MEMORIAL FOR PRESERVATION OF REMAINS OF DECEASED INDIVIDUAL

(76) Inventor: Nancy B. Dennis, 2312 Ridge Rd., Fabius, NY (US) 13063

(*) Notice: Subject to any disclaimer, the term of this patent is extended or adjusted under 35 U.S.C. 154(b) by 0 days.

(21) Appl. No.: 09/250,650

(22) Filed: Feb. 16, 1999

(51) Int. Cl.[7] .................................................. B29C 43/02
(52) U.S. Cl. ........................... 264/73; 264/122; 264/267; 264/331.19; 264/331.21; 264/112; 27/1
(58) Field of Search .................. 264/109, 112, 264/122, 125, 126, 241, 250, 267, 268, 330, 331.11, 331.19, 331.21, 113, 259, 73, 77; 27/1

(56) References Cited

U.S. PATENT DOCUMENTS 3,991,005 * 11/1976 Wallace .
5,016,330 * 5/1991 Botsch ........................................ 27/1
5,875,528 * 3/1999 Parker ........................................ 27/1
6,023,822 * 2/2000 Luebke ........................................ 27/1

* cited by examiner

Primary Examiner—Jan H. Silbaugh
Assistant Examiner—Kenneth M. Jones
(74) Attorney, Agent, or Firm—Bernhard P. Molldrem, Jr.

(57) ABSTRACT

Cremated ash remains of a deceased individual may be combined in a suitable resin material to fill a statuary urn or to fill a shell as a memorial to the decedent. The sculptural urn or shell may be molded of a resin in any desired shape. By use of a suitable resin with additives, the urn or shell may be molded with surface finishes such as marble, bronze, metal, ceramic, stone, and wood. The same resin may be mixed with the cremated ashes to fill the shell and to top off any remaining space. After the material cures the resulting sculpture may be place in a garden, shrine, or elsewhere as a permanent memorial.

14 Claims, 1 Drawing Sheet

METHOD OF MAKING A MEMORIAL FOR PRESERVATION OF REMAINS OF DECEASED INDIVIDUAL

BACKGROUND OF THE INVENTION

This invention relates to a technique for preserving the remains of a deceased individual. More specifically, the invention relates to a method for preserving cremated ash remains of a deceased individual by consolidating the ashes into a resin that solidifies within an urn or similar container to create a permanent, solid sculpture memorial.

OBJECTS AND SUMMARY OF THE INVENTION

It is an object of the present invention to preserve cremated ash remains of a deceased individual, which can be a human, or a beloved dog, horse, or other animal, by incorporating same into a memorial sculpture.

It is another object to retain the preserved ash remains of a deceased individual permanently in an attractive urn or similar container.

According to one aspect of the invention, an urn or hollow container can be formed in any desired shape, such as a statuary urn, to serve as a permanent memorial to the decedent. Suitable curable resin materials for the urn achieve a bronze, metal, ceramic, stone, or wood surface look. The cremated ash remains are mixed with the same curable resin material and the mixture is poured into the shell of the sculptural urn. This mixture is allowed to cure or solidify, and then any remaining space can be topped off with the resin. That is also allowed to cure. Favorably, the sculptural shell has an open bottom, and the same is inverted for this procedure, and then set right side up when complete. This technique results in a statue including the preserved remains, that serves as fitting tribute to the decedent and also beautifies home or garden.

DETAILED DESCRIPTION OF THE PREFERRED EMBODIMENT

Figure 1:
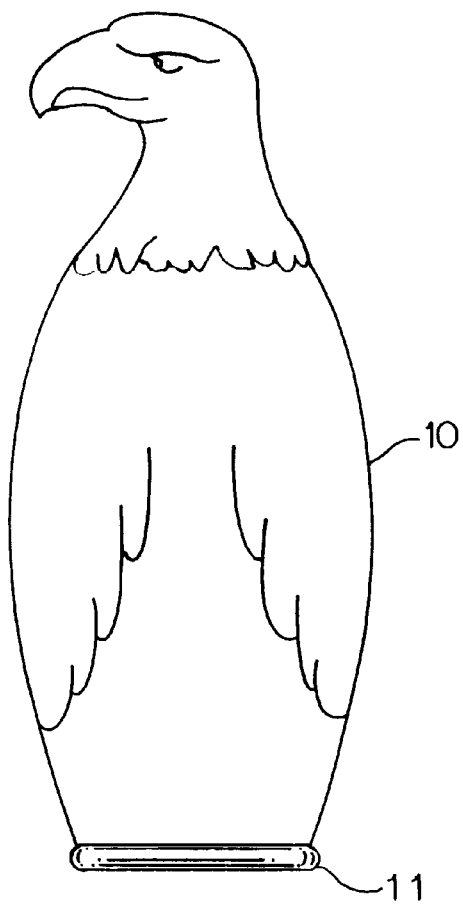
FIG. 1 is a perspective view of an urn that can be employed in the technique according to an embodiment of this invention.

With reference to the Drawing, FIG. 1 shows a statuary urn or receptacle 10 which is favorably molded as a hollow shell, and may be formed in a desired shape in a silicone rubber mold. The resin is selected to achieve a durable, but attractive statuary urn. Additives in the resin can produce surface finishes such as marble, bronze, metal, ceramic, stone, and wood. Urethane and/or polyester resins with a hardness of Shore D 70 and above are preferred.

For a marble-like statue, a suitable resin may be used such as material number 718-6245 from McWhorter Technologies with pigments added and/or 32-200 flex resin material from Reichhold Chemicals with pigments added, as well as color stabilizers, fillers, catalysts and opacifiers. A bronze look may be achieved by adding a bronze powder bonded with Poly 15-6, Poly 15-D65, Polypoxy 1010 or polyurethane liquid plastics which may be obtained, e.g., from Polytec Development Corporation. For a metallic finish, i.e., copper, gold, or silver, a urethane casting resin and a metallic powder may be used, such as the BJB series from Burman Industries or Alumilite. A ceramic or stone appearance may be achieved using a material such as Craftstone which may be obtained from Castolite Incorporated. A wood look may be achieved using a material such as Castowood and pecan shell filler, which may also be obtained from Castolite Incorporated.

Figure 2:
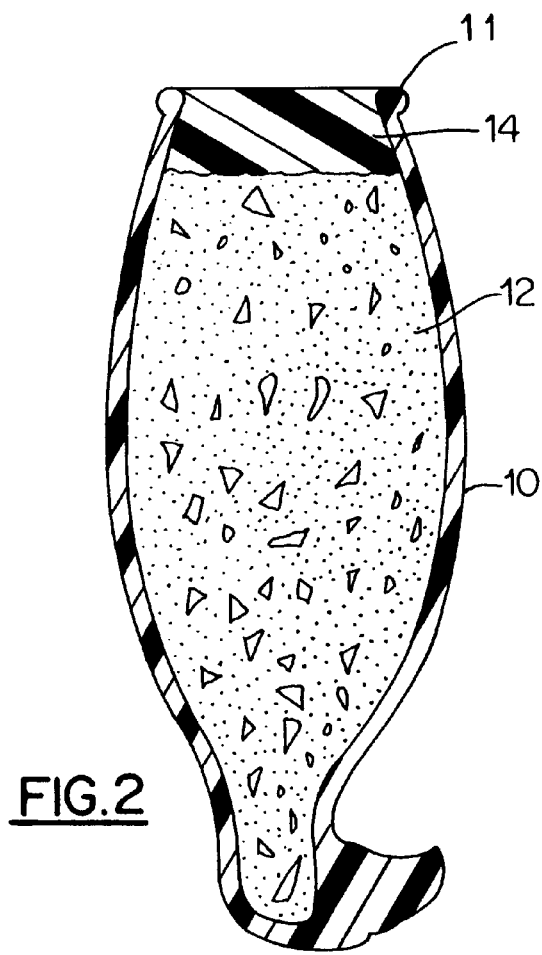
FIG. 2 is a cross-sectional, inverted view of the urn of FIG. 1 for explaining the method of this invention.

The process of incorporating ashes into the sculpture can be explained with reference to FIG. 2. The statuary urn 10 is inverted, with its open base 11 disposed at the top. Cremated ash remains are combined with resin to form a resin/ash mixture 12. The mixture 12 is transferred to the inside of the statuary urn 10 which fills the same nearly full, and then the resin/ash mixture 12 is allowed to cure. Any remaining space in the urn is filled with additional resin 14 and allowed to cure. This seals the remains completely and permanently within the urn, and provides a solid footing to the level of the formerly open base 11. Then the filled urn 10 is returned to a right-side-up orientation. The resulting sculpture contains the decent's remains securely embedded in resin and may be placed in a desired location, indoors or outdoors, as a memorial.

While the invention has been described with reference to one embodiment, it should be recognized that the invention is not limited to that precise embodiment. Rather, many modifications and variations will be apparent to persons skilled in the art without departing from the scope and spirit of this invention, as defined in the appended claims.

I claim:

1. A method for preserving cremated ash remains of a deceased individual, wherein the method comprises the steps of:
   a) obtaining a hollow shell of a substantially rigid durable material to serve as a permanent receptacle for said cremated ash remains;
   b) combining the ash remains with a resin to form a resin/ash mixture;
   c) filling said hollow shell with said resin/ash mixture to a level wherein the shell is at least partly full;
   d) allowing said resin/ash mixture to cure in said shell;
   e) filling any remaining space within said shell with an additional amount of said resin, said additional amount being free of said cremated ash remains; and
   f) allowing said additional amount of resin to cure in said shell.

2. A method as recited in claim 1, wherein the resin comprises a polyester material.

3. A method as recited in claim 1, wherein the resin comprises a urethane material.

4. A method for preserving the cremated ash remains of a deceased individual, wherein the method comprises the steps of:
   a) forming a hollow shell of a suitable curable resin material;
   b) curing said shell;
   c) combing the ash remains of the deceased individual with an additional amount of said curable resin to form a resin/ash mixture and filling said cured shell at least patty full with said resin/ash mixture;
   d) allowing said resin/ash mixture to cure within said shell;
   e) filling any remaining space within said shell with an additional amount of said curable resin material, said additional amount being free of said ash remains;
   f) allowing said additional amount of said curable resin material to cure in said shell.

5. A method as recited in claim 4, wherein the hollow shell is formed in a silicone rubber mold.

6. A method as recited in claim 4, wherein the cured shell has an open base.

7. A method as recited in claim 6, comprising inverting said cured shell prior to the step of filling with the resin/ash mixture.

8. A method as recited in claim 7, comprising, after the resin/ash mixture and said additional resin material have cured, placing said shell right side up.

9. A method as recited in claim 4, wherein the resin comprises additives to obtain a marble look finish.

10. A method as recited in claim 4, wherein the resin comprises a suitable bronze powder material to obtain a bronze-look finish.

11. A method as recited in claim 4, wherein the resin comprises a suitable metallic powder material to obtain a metal-look finish.

12. A method as recited in claim 4, wherein the resin comprises a suitable powder material to obtain a ceramic finish.

13. A method as recited in claim 4, wherein the resin comprises a suitable powder material to obtain a stone finish.

14. A method as recited in claim 4, wherein the resin comprises a suitable powder material to obtain a wood-look finish.

* * * * *

UNITED STATES PATENT AND TRADEMARK OFFICE
CERTIFICATE OF CORRECTION

PATENT NO.     : 6,200,507
DATED          : Mar. 13, 2001
INVENTOR(S)    : Nancy B. Dennis Page 1 of 1

It is certified that error appears in the above-identified patent and that said Letters Patent is hereby corrected as shown below:

In Col. 2, Line 58:

"patty" should read —partly—.

Signed and Sealed this

Fifth Day of June, 2001

*Attest:*

*Attesting Officer*

NICHOLAS P. GODICI

*Acting Director of the United States Patent and Trademark Office*